(12) United States Patent
Duvur et al.

(10) Patent No.: US 7,730,489 B1
(45) Date of Patent: Jun. 1, 2010

(54) HORIZONTALLY SCALABLE AND RELIABLE DISTRIBUTED TRANSACTION MANAGEMENT IN A CLUSTERED APPLICATION SERVER ENVIRONMENT

(75) Inventors: Sreeram Duvur, Fremont, CA (US); Sankara Rao Bhogi, Bangalore (IN); Akm N. Islam, Santa Clara, CA (US); Satish C. Viswanatham, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1566 days.

(21) Appl. No.: 10/732,387

(22) Filed: Dec. 10, 2003

(51) Int. Cl.
*G06F 9/46* (2006.01)
*G06F 11/00* (2006.01)

(52) U.S. Cl. .......................... 718/104; 714/2

(58) Field of Classification Search .............. 718/102, 718/104, 105, 100; 714/2, 15, 21, 36, 48, 714/4, 16, 20; 709/224, 226, 232, 223
See application file for complete search history.

(56) References Cited

U.S. PATENT DOCUMENTS

| | | | | |
|---|---|---|---|---|
| 5,095,421 A * | 3/1992 | Freund | ....................... | 718/101 |
| 5,247,664 A * | 9/1993 | Thompson et al. | ............ | 707/10 |
| 5,504,899 A * | 4/1996 | Raz | .............................. | 707/10 |
| 5,768,587 A * | 6/1998 | Freund et al. | ................ | 718/101 |
| 5,852,732 A * | 12/1998 | Freund et al. | ................ | 718/101 |
| 5,878,235 A * | 3/1999 | Porterfield et al. | .......... | 710/112 |
| 5,890,161 A * | 3/1999 | Helland et al. | .......... | 707/103 R |
| 6,009,405 A * | 12/1999 | Leymann et al. | ................ | 705/9 |
| 6,012,094 A * | 1/2000 | Leymann et al. | ............ | 709/230 |
| 6,101,527 A * | 8/2000 | Lejeune et al. | .............. | 709/201 |
| 6,105,147 A * | 8/2000 | Molloy | ........................ | 714/16 |
| 6,115,826 A | 9/2000 | Kinkade | | |
| 6,178,449 B1 * | 1/2001 | Forman et al. | ............... | 709/224 |
| 6,178,529 B1 * | 1/2001 | Short et al. | .................... | 714/51 |
| 6,247,038 B1 * | 6/2001 | Banks et al. | ................. | 718/100 |
| 6,295,548 B1 * | 9/2001 | Klein et al. | .................. | 718/101 |
| 6,374,243 B1 * | 4/2002 | Kobayashi et al. | ............. | 707/8 |
| 6,411,981 B1 * | 6/2002 | Klein et al. | .................. | 718/101 |

(Continued)

OTHER PUBLICATIONS

Blas, "transaction manager", Netscape communications corporation, 1999, pp. 1-10.*

(Continued)

*Primary Examiner*—Meng-Ai An
*Assistant Examiner*—Caroline Arcos
(74) *Attorney, Agent, or Firm*—Robert C. Kowert; Meyertons, Hood, Kivlin, Kowert & Goetzel, P.C.

(57) ABSTRACT

Various embodiments of a cluster of application servers in a networked computer system in which each application server includes a separate transaction manager instance are disclosed. In one embodiment, a separate transaction manager instance may be used to coordinate transactions initiated by an application component executing in process with the application server for a node of a cluster. If each transaction manager instance manages only transactions initiated within its own application server, then the loss of a single transaction manager instance may have no detrimental effect on transactions initiated in other nodes of the cluster. Further, if each transaction manager instance maintains its transaction logs in highly available memory accessible to all nodes of the cluster, in flight transactions of a failed node may be recovered by an instance in a different node.

41 Claims, 7 Drawing Sheets

U.S. PATENT DOCUMENTS

| | | | |
|---|---|---|---|
| 6,421,687 B1* | 7/2002 | Klostermann | 707/202 |
| 6,449,734 B1* | 9/2002 | Shrivastava et al. | 714/15 |
| 6,470,342 B1* | 10/2002 | Gondi et al. | 707/10 |
| 6,606,304 B1 | 8/2003 | Grinter et al. | |
| 6,609,213 B1* | 8/2003 | Nguyen et al. | 714/4 |
| 6,732,124 B1* | 5/2004 | Koseki et al. | 707/202 |
| 6,816,905 B1 | 11/2004 | Sheets et al. | |
| 6,832,238 B1* | 12/2004 | Sharma et al. | 709/201 |
| 6,834,275 B2* | 12/2004 | Kanai et al. | 707/1 |
| 6,928,477 B1 | 8/2005 | Leymann et al. | |
| 6,944,788 B2* | 9/2005 | Dinker et al. | 714/4 |
| 6,988,099 B2* | 1/2006 | Wiser et al. | 707/8 |
| 7,062,567 B2* | 6/2006 | Benitez et al. | 709/231 |
| 7,089,454 B2* | 8/2006 | He | 714/38 |
| 7,111,063 B1 | 9/2006 | Clark et al. | |
| 7,127,712 B1 | 10/2006 | Noble et al. | |
| 7,178,050 B2* | 2/2007 | Fung et al. | 714/4 |
| 7,181,574 B1* | 2/2007 | Lele | 711/137 |
| 7,206,817 B2 | 4/2007 | Fanshier et al. | |
| 7,213,049 B2* | 5/2007 | Felt et al. | 709/203 |
| 7,380,155 B2* | 5/2008 | Fung et al. | 714/4 |
| 7,421,695 B2* | 9/2008 | Murray et al. | 718/105 |
| 7,437,361 B2* | 10/2008 | Luo | 707/8 |
| 2002/0103663 A1* | 8/2002 | Bankier et al. | 705/1 |
| 2003/0050972 A1* | 3/2003 | Felt et al. | 709/203 |
| 2003/0177150 A1* | 9/2003 | Fung et al. | 707/204 |
| 2003/0177411 A1* | 9/2003 | Dinker et al. | 714/13 |
| 2003/0182427 A1* | 9/2003 | Halpern | 709/226 |
| 2003/0233433 A1* | 12/2003 | Halpern | 709/222 |
| 2003/0233648 A1 | 12/2003 | Earl et al. | |
| 2003/0236867 A1 | 12/2003 | Natsuno et al. | |
| 2004/0083225 A1* | 4/2004 | Gondi et al. | 707/100 |
| 2004/0254984 A1 | 12/2004 | Dinker | |
| 2005/0125557 A1* | 6/2005 | Vasudevan et al. | 709/239 |
| 2006/0245388 A1 | 11/2006 | Jeon | |
| 2007/0112574 A1* | 5/2007 | Greene | 705/1 |

OTHER PUBLICATIONS

Rabbat et al., A high-availability clustering architecture with dada integrity guarantees, IEEE, 2002, pp. 1-5.*

Lomet et al., "Efficient transparent application recovery in client-server information systems", microsoft, 1998, pp. 460-471.*

Zhang et al. ("Ensuring relaxed atomicity for flexible transaction in multi database systems", ACM, 1994, pp. 67-78).*

Linda G. DeMichiel, "Chapter 22 of EJB Specification 2.1," Sun Microsystems, Nov. 12, 2003(pp. 493-500).

Rahul Tyagi, "A Brief Review of the EJB 2.1 Specification,"http://builder.com.com/5100-6386_14-1049431-1-1.html, Sep. 16, 2002, (3 pages).

"BEA WebLogic Server™ and BEA WebLogic Express™: Programming WebLogic JTA," Jun. 24, 2002, (94 pages).

"WebSphere Commerce V5.5 Handbook Customization and Deployment Guide." IBM, Nov. 2003, (pp. 109-132).

* cited by examiner

HORIZONTALLY SCALABLE AND RELIABLE DISTRIBUTED TRANSACTION MANAGEMENT IN A CLUSTERED APPLICATION SERVER ENVIRONMENT

BACKGROUND OF THE INVENTION

1. Field of the Invention

The invention relates to computer systems and computer software, and more particularly to highly available transaction management in computer systems.

2. Description of the Related Art

Some application programs, particularly business applications, may require that the results of sets of data modifying operations be committed to permanent storage atomically, that is either together or not at all, in order for the data to remain consistent and to maintain data integrity. Such a set of operations may be referred to as a transaction. An application may designate operations to be included in a transaction by including a statement to initiate a transaction, designating an identity for the transaction, and concluding the operations included in the transactions with a command to commit the database operations to permanent storage.

An example of an application in which a transaction may be beneficial is a banking application in which funds are transferred from one account to another. The application may accomplish the transfer by performing a withdrawal from one account and a deposit to another account. If the withdrawal operation completes but the deposit operation does not, the first account may reflect and improper balance. Conversely, if the deposit operation completes, but the withdrawal fails, the second account may show an improper balance. In the case of such a set of interdependent operations, neither the withdrawal nor the deposit should complete unless both can complete. By including both the withdrawal and deposit operations in a transaction, the application may designate that the operations are required to complete atomically.

In some cases, a transaction may be limited in scope to operations, which modify data in only one database on a single backend system. Such operations may be referred to as local transactions and the database or backend resource manager may itself, manage such transactions using a single-phase commit protocol. In other instances, a transaction may span multiple databases, backend systems, and/or resource managers. Sometimes a transactional message may need to be sent to another application, after the database operation. Transactions involving multiple backend systems and/or multiple front-end participants may be referred to as distributed or global transactions. Global transactions may require transaction coordination by a transaction manager external to the backend systems involved in the transaction. The transaction manager may coordinate a global transaction using a two-phase commit protocol.

At some point during the execution of a global transaction, the application may issue a request to the transaction manager to commit the transaction. Since the transaction involves multiple data resources, the transaction manager may use a two-phase commit protocol to insure transaction atomicity. Under a two-phase commit protocol, the transaction manager may query each participating data source as to whether it is prepared to commit the results of the transaction to permanent storage. The transaction manager may wait for responses from each participant, and when a full complement of affirmative responses has been received, may issue a commit request to each participant. The transaction manager may wait for "done" responses from each participant and may only mark the transaction as being completed upon receiving responses from all participants.

Since these communications may take time and failures may potentially occur in the midst of a transaction, the intermediate status of pending transactions may be logged. A log record may be generated for each "in-flight" transaction. These log record are referred to as transaction logs.

Given the amount of communications necessary to support a global transaction under a two-phase commit protocol for a large number of participants, faults and/or failures may occur in one or more of the participants that may effect the commitment of the transaction. A robust two-phase commit protocol may allow for recovery from most participant failures, but may not provide for recovery in the case of failure of the transaction manager. A transaction manager may be coordinating several transactions at any given time. Some of the transactions in flight at the moment of failure may be in an indeterminate state, depending upon the phase of the transactions when the transaction manager failure occurs. Inability to recover and revert the states of the transactions in all participants may result in application hangs due to locked resources and other problems.

SUMMARY

Various embodiments of a cluster of application servers in a networked computer system in which each application server includes a separate transaction manager instance are disclosed. In one embodiment, a separate transaction manager instance may be used to coordinate transactions initiated by application components executing in the application server process, for a node of a cluster. This transaction manager may be shared by all application components executing inside the application server process. In one embodiment, a transaction manager may be created for each application executing inside the application server process. In such a system, multiple transaction manager objects may be created inside one application server process. If each transaction manager instance manages only transactions initiated within its own application server, then the loss of a single transaction manager instance may have little or no detrimental effect on transactions initiated in other nodes of the cluster. Further, embodiments of this architecture may avoid or lessen bottlenecks to performance and scalability when several application server nodes are included in a cluster. In one embodiment, each transaction manager instance maintains its transaction logs in highly available storage accessible to all nodes of the cluster, such that in flight transactions of a failed node may be recovered by an instance in a different node.

In one embodiment, a Domain Administration Server may monitor the health of all application server instances. This may be done in a variety of ways such as having each instance generate a message (heartbeat) to the Domain Administration Server with a given periodicity. Detection of a failed application server instance may be denoted by the absence of its heartbeat. In another embodiment, the Domain Administration Server may poll each application server instance periodically to determine its health. Failure to respond to the poll may indicate a failure of the polled instance. Once a failure is detected, the Domain Administration Server may select one of the other cluster instances to recover the downed server's incomplete transactions. The surrogate application server instance may initiate a transaction with the highly available storage to transfer ownership of the failed server's transactions logs to itself. Upon successfully acquiring ownership of the failed server's transaction logs, the surrogate transaction manager instance may attempt to recover in flight transactions.

In another embodiment, the method for detecting a non-restarting server may not involve a Domain Administration Server. The application server instances may be responsible for monitoring one another. When they detect a loss of cluster membership triggered by failure of one or more application server instances, another instance determined by a simple selection algorithm (e.g. the server instance whose ID is greater than and closest to that of the downed server) may have the responsibility to change the ownership of all log records in the highly available store from that of the failed server to its own and to attempt to recover the failed server's in flight transactions.

In some cases a node may fail due to software problems rather than hardware. In such cases, a server restart may be required to correct the problem. This may be a simple application server process restart or an operating system reboot. As described above, each application server may have its own transaction manager in order that the failure of one instance may not adversely effect transactions in another instance. A transaction manager may maintain persistent transaction logs to facilitate transaction recovery after server failure and restart. Upon restart, the server may attempt to appropriately recover (i.e. forget or remove) the transactions that were in flight at the time the failure occurred. This may involve contacting each data source involved in one of the transactions. In one embodiment, an amount of time during which the transaction manager may wait for a data source to respond during recovery may be specified to ensure that the recovery process will terminate in a reasonable amount of time. If one or more required data sources fail to respond within this period, the transaction log record may be retained in preparation for deferred recovery. Successfully recovered transactions may be removed from the log.

When it is not possible to recover all transactions from the pre-failure transaction log during the period specified for transaction service recovery, additional attempts to recover the remaining transactions may be made at intervals specified by a deferred recovery interval. These additional attempts to recover transactions may continue to be made until a specified maximum number of transaction recovery attempts is reached. Once all specified attempts to recover the transactions from the transaction log have been made, an error message may be produced indicating that manual intervention is required to recover the remaining transactions, and providing information on the applications and data sources involved in the outstanding transactions.

When a server instance fails and does not automatically restart within a certain configurable time period, another server instance in the cluster or a domain administration server process, may begin recovery on behalf of the failed server process, as described above. While this recovery is in progress, the failed server process may restart and attempt to perform recovery by itself and possibly interfere with the recovery already being performed by the other server instance or the domain administration server. In one embodiment, the restarting server may be stalled from starting up until pending recovery is signaled as completed. This may be referred to as "Fencing." In another embodiment, another server process (es) and/or the domain administration server may take ownership of the logs for transactions being recovered. This may be done by including an owner field in the transaction log record, which is transactionally changed to indicate the other server(s) as owner as appropriate. In one embodiment, the log records may be stored in a relational database. In another embodiment the transactions log files are physically duplicated to a separate location by the server(s) taking over ownership. The original log files for the failed server may be emptied so that the restarting server may begin service sooner.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Figure 1:
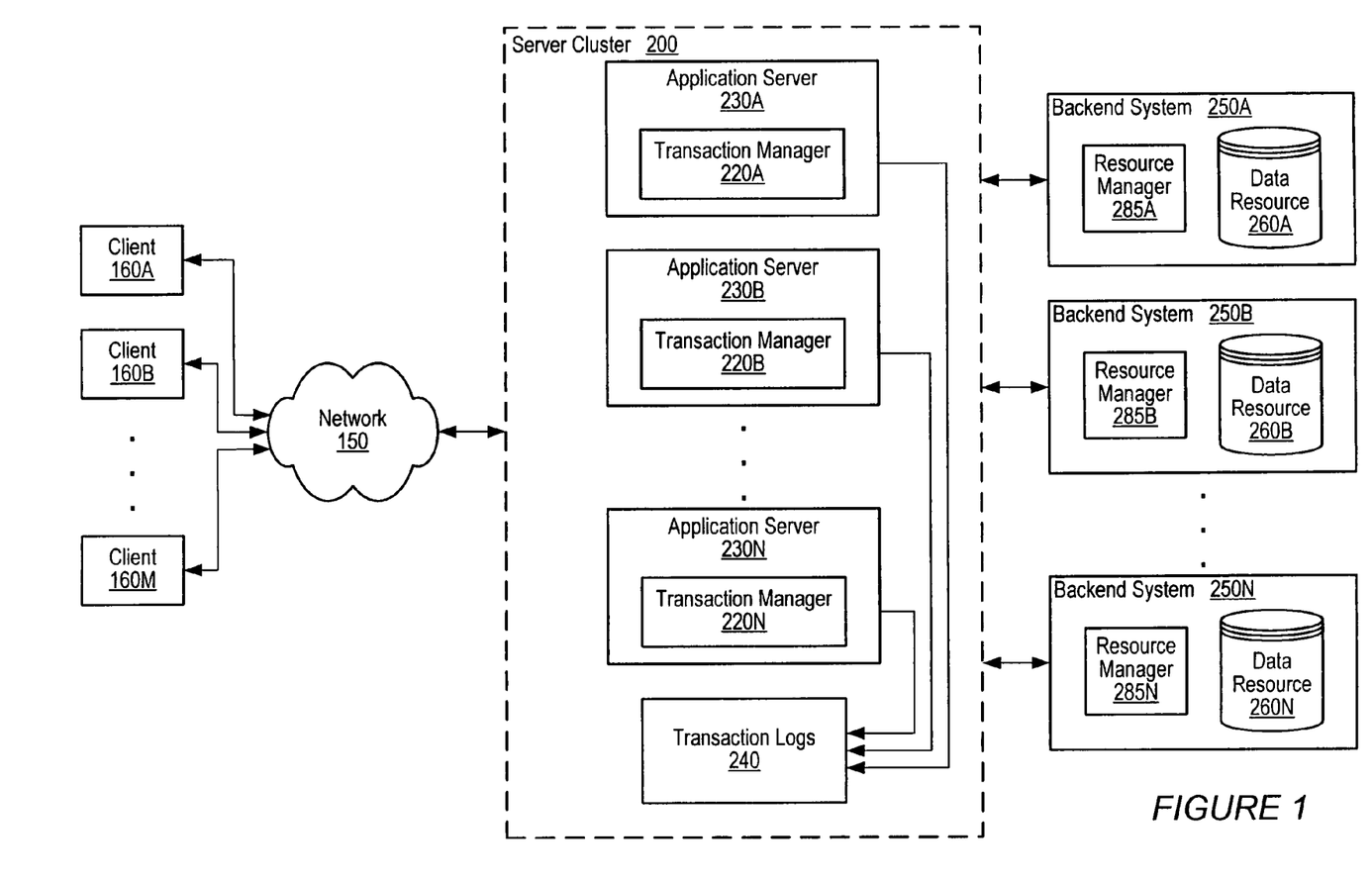
FIG. 1 illustrates a system, which may be suitable for implementing various embodiments of the disclosed invention, according to one embodiment.

FIG. 1 illustrates a system, which may be suitable for implementing various embodiments of the disclosed invention, according to one embodiment. The application logic of the computer system may be divided into application components (e.g., applets, servlets, server pages, beans, application clients, database objects) according to function, and the various application components may be installed on different computers depending on factors such as security and load distribution. Tiers may represent the logical or physical organization of the application components, which may operate across one or more different computers. The different computers may be based on different platforms and architectures. In one embodiment, the application components of the computer system may be based on a three-tier architecture. In other embodiments, the application components of the computer system may be based on a two-tier or N-tier architecture.

The first, or client tier may include a number of different clients 160A through 160M (e.g., device, system, user interface) communicating to application components (e.g., servlets, server pages, beans) in the middle tier server cluster 200 via a network 150, and example of which may be the Internet. The middle tier may include a number of different Web servers and/or application servers 230A through 230N. The backend tier may include a number of different computer systems 250A through 250N including data resources 260.

Application and Server components may communicate using different types of protocols and technologies such as Hyper Text Transfer Protocol Secure sockets (HTTPS), Internet Inter Orb Protocol (IIOP), Java™ Database Connectivity (JDBC), Java Naming and Directory Interface (JNDI), custom eXtensible Markup Language (XML) over HTTP and/or Simple Object Access Protocol (SOAP). The application components within a tier typically communicate with remote application components in an adjacent tier. For example, multiple users with access to an application component configured to operate in a client tier (e.g., application client accessible via a Web browser) may initiate requests (e.g., application program call) to each remote application component configured to operate in a middle tier. Each application component in the middle tier may, in turn, initiate requests to the backend tier on behalf of the application component in the client tier. For example, an application component in the middle tier (e.g., bean) may receive a remote request from a Web browser operating in the client tier and in response access an application component (e.g., database object) operating in the backend tier. The application component in the backend tier may then provide a response to the application component in middle tier, which may complete the remote request.

The rate at which requests for a particular application component are generated by the client tier may vary greatly depending upon the type of the application. For example, demand for a stock price quoting application may by very high during the hours that the market is open, but may be almost non-existent when the market is closed. In another example, requests for an application to file income tax returns may languish near zero for most of the year, but may increase exponentially in the period leading up to April 15. In most cases, the inability to process a client request may result in a loss of revenue, but permanently allocating sufficient server resources capable of processing requests at a peak level may result in a severe underutilization of resources, on average. Therefore, it is quite important to be able to scale application processing resources to meet client demand.

One method of scaling processing resources to meet changing user demand is by clustering application servers 230. In a server cluster 200, several application servers 230 may be dedicated to executing the same application component allowing for a manifold increase in the number of client requests that can be serviced per unit time. Incoming client requests may be distributed among the nodes of the server cluster 200 in a number of different ways. For example, all requests may be sent to a first node until a certain percentage of the capacity of that node is being utilized. Subsequently received requests may be forwarded to a second node, and so on until the client demand is met. Alternatively, incoming requests may be distributed in a round-robin scheme or by such a scheme taking into consideration the current workloads of the individual nodes.

In some instances, a client may make several related requests in order to allow a user to achieve some goal such a making a purchase or filing their income taxes. Often, these requests may cause the middle tier application component to access data resident on one or more backend systems in the form of transactions. In these cases, the processing of a given request may depend upon the results of one or more previous requests and/or transactions and therefore, the application may need to store these results until the user's goal is achieved. Such sets of related requests and/or transactions may be referred to as sessions and the associated stored data may be referred to as the session state.

Depending upon how a server cluster 200 may be operated, incoming requests with a given session ID may be sent to the same node for processing. This scheme has the advantage of only one node being required to store the data for the session state rather than storing copies in each node or a generally accessible storage location. On the negative side, however, in the event of a hard failure of a cluster node, in-process transactions and the session state itself may be non-recoverable. Further the aborted transaction may leave data in a non-deterministic state and even lock up some resources preventing further progress. The user may even be forced to start the session over from scratch which may not be a particularly appealing proposition to a person who has just spent and hour entering information for tax filing.

Reliable cleanup may be performed by recovery functions in the transaction manager. In some embodiments, transaction recovery may be performed by the failed server itself when it restarts or it may be performed manually by the administrator with the help of tools. In other embodiments, transaction recovery may be automatically performed by surviving members of an application server cluster.

If a central transaction coordinator is used to coordinate transaction across all nodes of the cluster 200, a failure of this central manager will impact all the nodes in the cluster. Such a centralized design is also likely to limit the number of application server nodes that may be added to a cluster. Also keeping a central transaction manager may be a performance bottleneck since it now requires network communication between all application server nodes to the transaction manager nodes, for every aspect of every global transaction.

In other embodiments, a session may be distributed over multiple nodes of an application server cluster. Under this method of operation, incoming requests with the same session ID may be distributed to whichever node has the lightest workload at the time the request arrives. Since potentially any node in the cluster may be called upon to process a portion of any session at any time, the transaction coordination function and current transaction log information must be available to all nodes of the cluster. In one embodiment, copies of the transaction logs for all transactions may be kept on each node of the cluster. This may provide for each node having current transaction state data, but may require substantial amounts of network traffic as each transaction coordination function updates logs on every cluster node. In another embodiment, all transaction logs may be kept in highly available storage available to all nodes of the cluster. This may reduce network traffic in that each transaction coordination function needs only update transaction status in a single location.

In systems employing centralized transaction management, a single transaction manager may coordinate transactions for all nodes of an application server cluster. Since only one entity requires knowledge of the current state of transactions, the transaction logs may be kept on the node running the centralized transaction manager and no network traffic need be generated for transaction log maintenance. However, a centralized transaction manager may present a bottleneck to system performance depending upon the volume of transactions generated by the cluster. Perhaps more importantly, the centralized transaction manager may present a single point of failure from which in flight transactions may not be recoverable. For example, if all transactions logs are kept in the node on which the centralized transaction manager executes and this node suffers a hardware failure, the data in transaction logs may not be accessible to any other cluster node and transactions that were not committed prior to the failure may not be recoverable. In an embodiment such as is illustrated in FIG. 1 employing distributed transaction management, each application server 230 may include its own transaction manager instance 220 that coordinates those transactions initiated within that application server. Each transaction manager instance 220 may maintain its transaction logs 240 in highly available storage that is accessible by all nodes of the cluster 200. Under this configuration, the loss of a single transaction manager instance 220 may not effect transactions initiated in any other node and because the logs 240 of the failed unit are available to the other nodes of the cluster, the failed node's in flight transactions may be recoverable. In one embodiment, the persistent transaction logs may be kept on a highly available file system. The application server may be configured to allow the location of the logs to be customizable by an administrator. In one embodiment, a built-in highly available database may be provided for storing the transaction logs.

Figure 2:
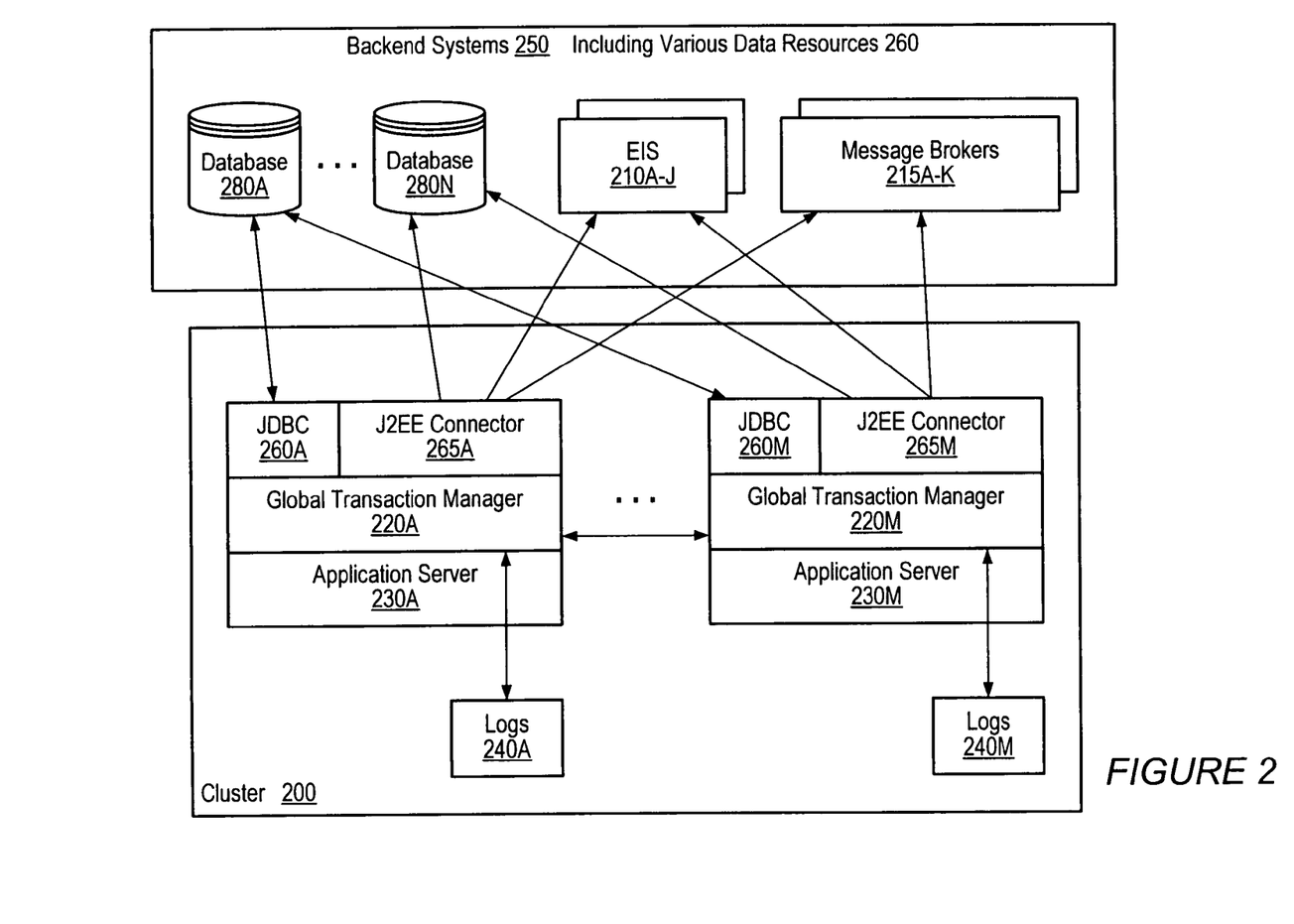
FIG. 2 illustrates a server cluster in which each node may communicate with a variety of backend data systems including databases, Enterprise Information Systems, and Message Brokers, according to one embodiment.

FIG. 2 illustrates server cluster 200 in which each node can communicate with a variety of backend data systems including databases 280, Enterprise Information Systems 210, and Message Brokers 215. Application components may use connectors 265 for communicating with Enterprise Information Systems 210, and Message Brokers 215 while using JDBC 260 for accessing databases 280. Any of the data resources may participate in transactions coordinated by transaction managers 220. A client may issue a request to an application component executing in application server 230A. As an example, the application component executing in application server 230A may be part of a banking application, and the request may be to transfer funds from one account to another. The information on one account may reside on database 280A while that of the other account is in database 280N. The application may accomplish the transfer by performing a withdrawal from the first account and a deposit to the other account. If the withdrawal operation completes but the deposit operation does not, the first account may reflect and improper balance. Conversely, if the deposit operation completes, but the withdrawal fails, the second account may show an improper balance. In the case of such a set of interdependent operations, neither the withdrawal nor the deposit should complete unless both can complete. By including both the withdrawal and deposit operations in a transaction, the application may designate that the operations are required to complete atomically.

A transaction manager 220 may execute in the same container process as the corresponding application component and application server 230. This avoids process hops and reduces network traffic for performing global transactions. Thus, all transactions initiated by an application component executing in application server 230 may be coordinated by a corresponding transaction manager 220 and logged in a transaction log 240. As opposed to centralized transaction management, a distributed or de-centralized transaction management for cluster 200 may facilitate scalability and provide higher availability of transaction services. De-centralization of the transaction coordination function also provides that the failure of any one transaction manager instance impacts only those transactions that are being coordinated by the failed server instance.

Figure 3:
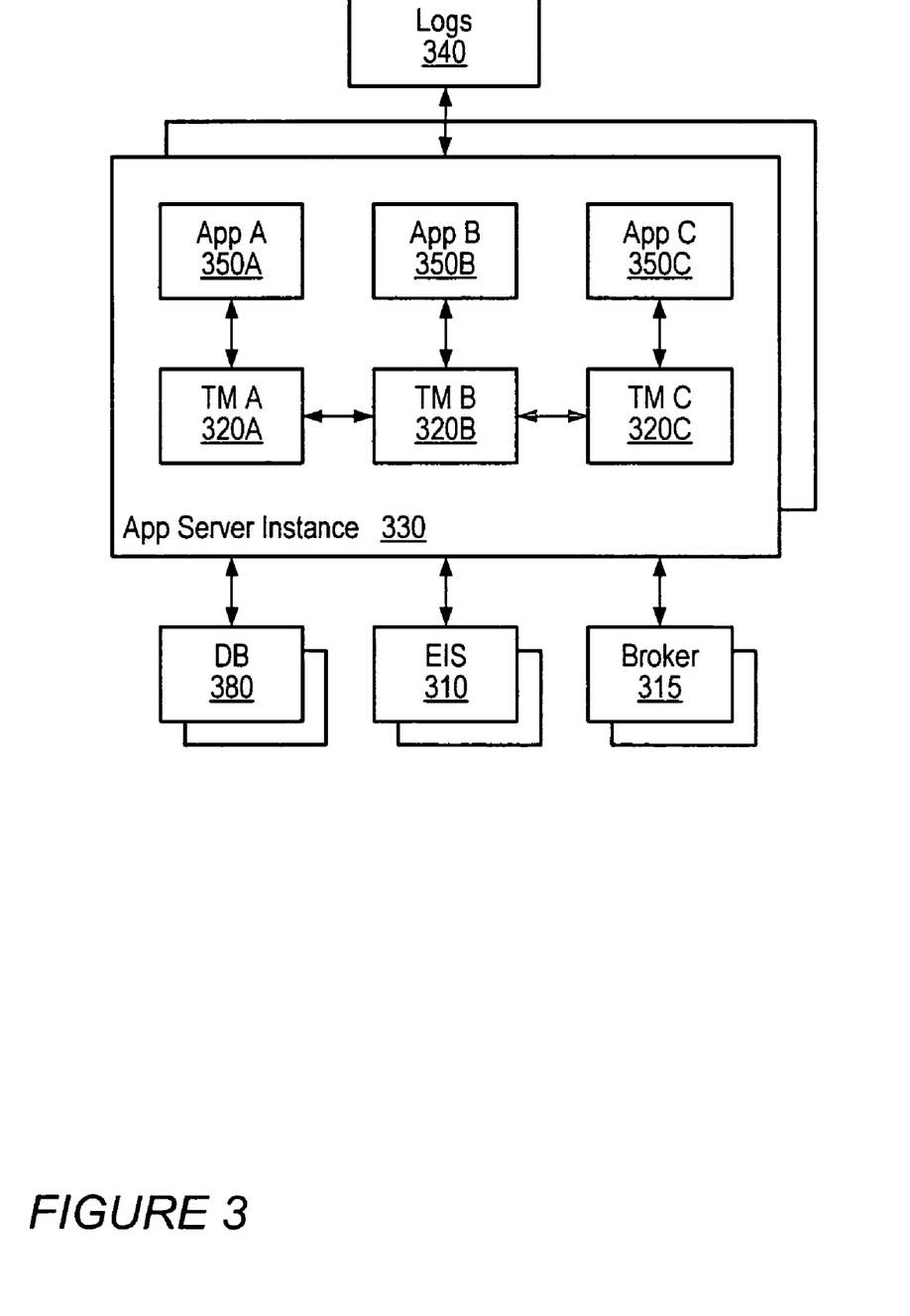
FIG. 3 illustrates an application server including transaction managers, according to one embodiment.

FIG. 3 illustrates a system in which one transaction manager 320 may be operated for each application 350 running in an application server 330. Using this design, if one application is malfunctioning or creating too many transactions, other applications will not be affected. Logs 340 for each of the transaction managers 320 may be logically or physically separated, based on an Application Identifier. Transactions may propagate between transaction managers 320 in the same application server. For example, if a component in Application A 350A, calls a component in Application B 350B, under the same transaction context the transaction may propagate from transaction manager 320A to transaction manager 320B. The originating transaction manager 320A will remain the primary transaction coordinator. In the event of failure of a transaction manager 320, only the transactions coordinated by the failed instance(s) are affected. The user application may receive exceptions and the resource managers for the involved data resources may roll back business transactions. In some cases, the affected transactions may end up in an invalid state, which may be corrected by the use of standardized transaction recovery protocols.

In addition to providing for scalability and load balancing, sever clustering may also provide benefits in cases or server failure. For example, if all servers in a cluster are running the same application component and one node fails, hard failure recovery may take the form of transferring the workload of the failed unit over to an idle member of the cluster. In another case, the work of the failed unit may be distributed in some manner to the remaining functional cluster nodes. In yet another scenario, each platform in the cluster may have a redundant "hot" backup executing in parallel, but with its output disabled. As may be inferred from the above descriptions, each failure recovery mechanism may have a different amount of time and degree of system interruption associated with it. In one instance, all sessions being executed by the failed node may have to be reinitiated by the user, whereas a different recovery mechanism may allow for the transition to new hardware without the users noticing any degradation of service. However global transactions in-flight at the time of the crash may fail and may deliver exceptions to the user application. Some transactions may be in the midst of the two phase commit protocol and may need intervention in order to rest the state logically. This intervention may be provided by restarting the server or perhaps by a surrogate server. When this recovery is automated, data resources may revert to a clean state sooner and result in smooth application operation. Automation may also reduce operation overhead and human errors.

A node may fail due to software problems rather than a hardware failure. In these instances, a server restart may be all that is required to correct the problem. The elapsed time from the detection of a failure to a server restart recovery from a software problem may typically be orders of magnitude less than the time needed to repair or replace a unit experiencing a hardware failure. If the time from failure to server restart is short enough, the transaction manager instance may be able to perform recovery by itself.

More lengthy intervals between server failure and restart may produce more severe effects on the user session. After an application server function has been lost for a certain length of time, transactions being managed by that instance may time out and, in some embodiments, the state may be rolled back by the participants. In other embodiments, a transaction time out may result in other actions by the participants. For example, failure to receive a commit command for an in process transaction may cause the participants to forget all progress along the current branch path to the last checkpoint. This may cause the session to resume a previous state and require the user to re-enter some data and/or re-select some previous options. The user may be acutely aware that some problem has occurred and may be inconvenienced to some degree. As described below, a configurable timeout value may be specified to wait after detection of a server failure before surrogate recovery is initiated. If the failed server does not restart before this timeout, another instance may attempt to recover the failed server's transactions. It may be desirable to specify different timeout values depending on the site architecture.

As described above, each application server may have its own transaction manager in order that the failure of one instance may not adversely effect transactions in another instance. A transaction manager may maintain persistent transaction logs to facilitate transaction recovery after server failure and restart. Upon restart, the server may attempt to appropriately recover (i.e. resume, forget or roll back) the transactions that were in flight at the time the failure occurred. This may involve contacting each data source involved in one of the transactions. In one embodiment of the disclosed invention, an amount of time during which the transaction manager may wait for a data source to respond during recovery may be specified as a system parameter. This may ensure that the recovery process will terminate in a reasonable amount of time so that the server may resume normal operation. If one or more required data sources fail to respond within this period, the transaction log may be updated and stored in preparation for deferred recovery. Properly recovered and completed transaction logs may be removed.

Figure 4:
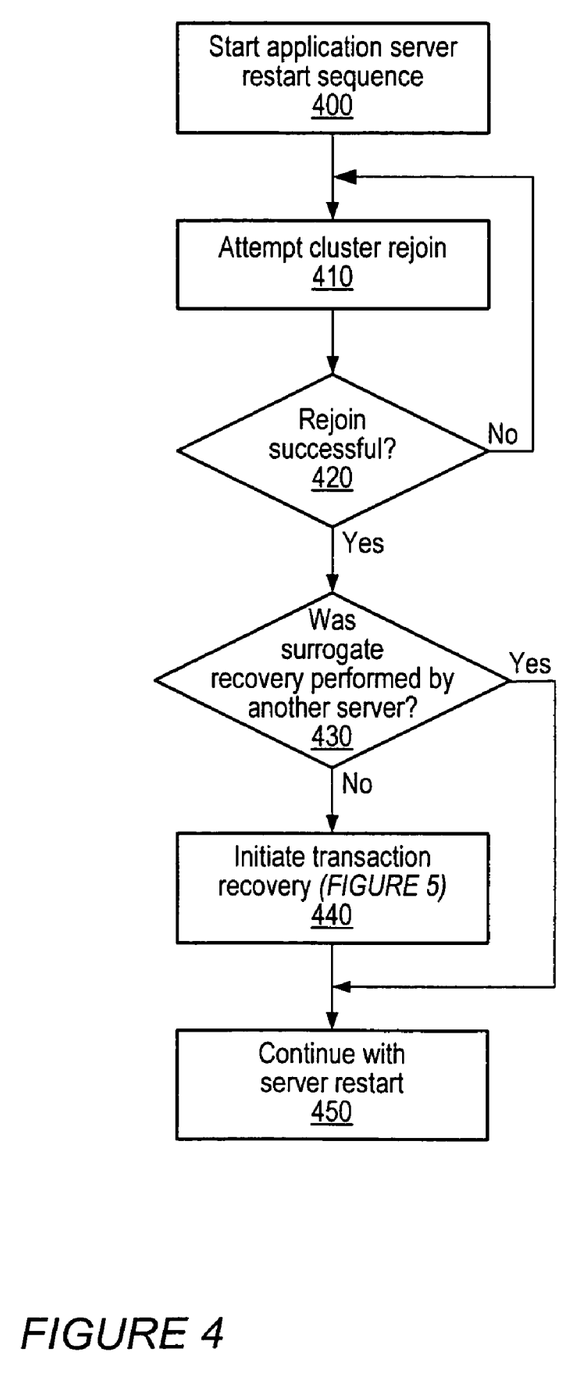
FIG. 4 is a flowchart of a method for restarting a server that failed while coordinating one or more transactions, according to one embodiment.

FIG. 4 is a flowchart of a method for restarting a server that failed while coordinating one or more transactions, according to one embodiment. At block 400 the failed application server including a transaction manager instance is restarted. Block 410 illustrates that upon restart, the application server may attempt to rejoin the cluster of which it is a member. If it is a stand-alone (non-clustered) application server, this may be unnecessary. If the cluster rejoin is successful (block 420), the server may determine, at block 430 whether surrogate recovery was performed during the time it was not active. If surrogate recovery was already performed, the server may continue to restart normally, as shown in block 450. Otherwise the server may initiate transaction recovery, as indicated by block 440. The initiation of transaction recovery may include attempting to reestablish connections with all transaction participants. Recovery of a given transaction may be attempted a number of times separated by a set time interval before administrative intervention is requested. If the elapsed time since the server failure has been short enough that the transaction phases have not timed out, the transaction manager may attempt to instruct the resource managers to either roll back work done on behalf of a transaction branch or to forget a completed transaction branch. The actual recovery process with deferral is shown at a high level in FIG. 5

Figure 5:
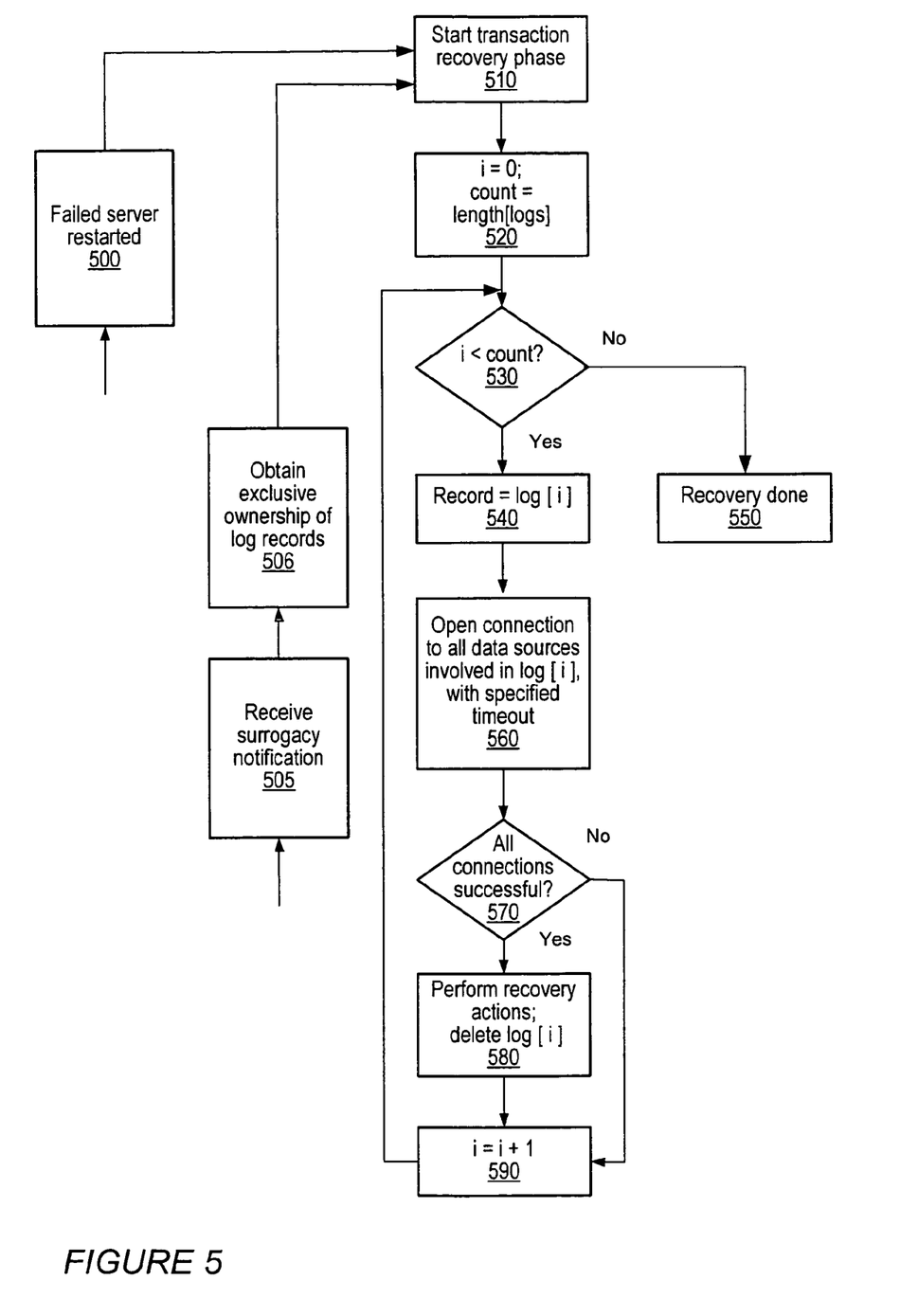
FIG. 5 is a flowchart of a method for recovering in-flight transactions subsequent to the restart of a failed application server or surrogate designation, according to one embodiment.

FIG. 5 is a flowchart of a method for recovering in-flight transactions subsequent to the restart of a failed application server or surrogate designation, according to one embodiment. If the failed server is able to restart, as indicated at block 500, it may attempt to recover in flight transactions as shown in block 510. If the failed server does not restart before surrogate selection occurs, as illustrated by block 505, the surrogate may attempt to obtain exclusive ownership of the failed server's transaction logs, as shown at block 506. This may be performed by transactionally changing ownership information for each record or by simply making a separate copy and clearing the original log file. Once the surrogate has exclusive ownership of the failed server's transaction logs, it may attempt to recover in flight transactions as shown in block 510. In one embodiment, a timeout may be specified for a delay before surrogate recovery is initiated. If the failed server does not restart before this timeout, surrogate recovery may be performed. It may be desirable to specify different timeout values depending on the site architecture.

At block 520, the number of in flight transactions to be recovered may be determined from the transactions log and a counter initialized. A transaction may be selected for recovery from the log, as shown at block 530. A check to determine if there are further log entries remaining to be processed may be made at decision block 530, and if there are none, as illustrated by block 550, the transaction recovery process may terminate.

If log entries remain, at block 540, the next one in sequence may be selected. At 560, the server may attempt to open connections to all data sources involved in the transaction to be recovered and set a timeout period for the recovery attempt. If all data sources can be contacted, as determined at block 570, the transaction may be recovered, as shown in block 580, by rolling back to a previously saved checkpoint, or forgetting the transaction entirely, and deleting the entry from the log. If the timeout period expires prior to connecting with all data sources, timing may be initiated for deferred transaction recover as detailed below. When appropriate actions for the given transaction are complete, the counter may be incremented as shown in block 570, in order to access the next log entry. If, after having attempted to recover all entries in a transaction log for the specified timeout period, all transactions have not been recovered due to inability to reach one or more of the transaction participants, deferred transaction recovery may be initiated. In one embodiment, deferred transaction recovery may include waiting for some specified period of time and then beginning a new transaction recovery phase at block 510 of FIG. 5. This may minimize the impact of attempting to recover in flight transactions on the ability of the restarted instance to provide service. In particular it may preclude the server from "hanging" during restart due to unreachable in flight transaction participants.

The additional, deferred attempts to recover transactions may continue to be made until a maximum number is reached. Once all specified attempts to recover the transactions from the transaction log have been made, a log message may be produced indicating that manual intervention is required to recover the remaining transactions, and providing information on the applications and data sources involved in the outstanding transactions. This may minimize the impact of attempting to recover in flight transactions on the ability of the restarted instance to provide service. In particular it may preclude the server from "hanging" during restart due to unreachable in flight transaction participants.

Recovery of in flight transactions subsequent to the failure of a node in an application server cluster may be dependent upon the ability to access the transaction logs of the transaction manager of the failed application server and to successfully transfer ownership of these logs to another transaction manager instance. After certain failures, the transaction manager may be able to access its logs upon restart without difficulty and resume or recover its in flight transactions. In the more general case, it may be necessary to involve other nodes in the recovery. If the transaction logs are maintained only within a single node and that node experiences a failure, another node may not be able to access this data. Therefore, in one embodiment, transaction logs may be maintained in a highly available storage accessible to each node of the cluster.

Figure 6:
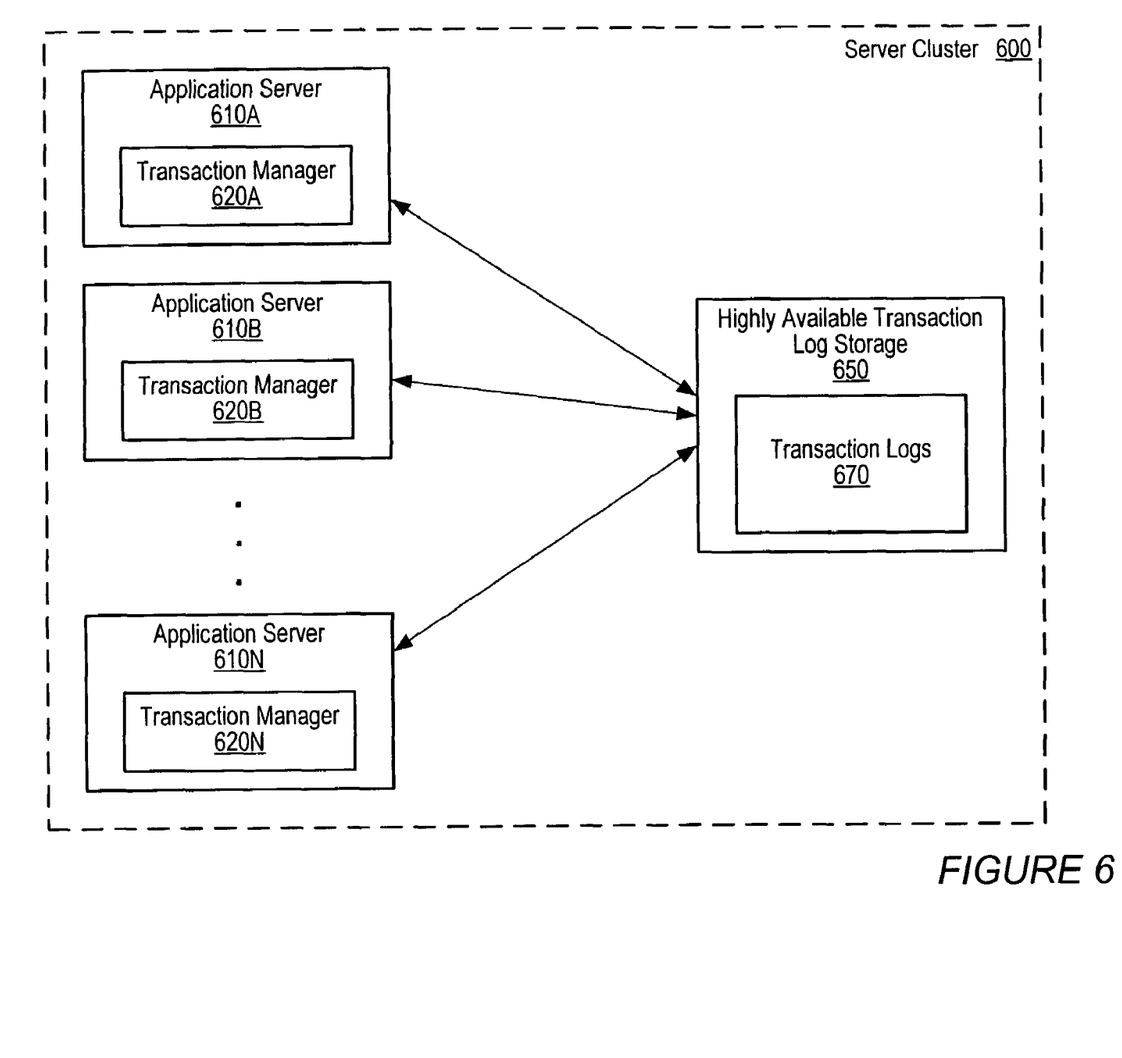
FIG. 6 illustrates a server cluster including highly available transaction log storage, according to one embodiment.

FIG. 6 illustrates a server cluster 600 including highly available transaction log storage 650. The term highly available storage may indicate that the contents are available to all nodes of the application server cluster. It may also indicate that the storage itself includes some sort of redundancy for fault tolerance. An example of highly available memory might be a Redundant Array of Independent Disks (RAID). RAID allows for several different configurations of data on physical disks depending upon what level of fault tolerance is desired. One simplistic arrangement may be to have all data written to a primary and backup disk set in which both disk sets are accessible by each node in a cluster. Any access error may cause the nodes to switch to the backup disk for disk that failed. No matter how the highly available memory is implemented, any node may be able to access the transaction log of any transaction manager in the cluster in the event of a node failure.

An instance of a transaction manager 620 may never restart in the case of a hardware failure of its node. Therefore, the transaction log 670 for that transaction manager 620 may need to be accessed by another instance in the cluster in order to recover in flight transactions. The detection of a non-restarting server 610 and subsequent recovery of its incomplete transactions may be performed in various ways. In one embodiment, a centralized administrative server referred to as a Domain Administration Server may monitor the health of all application server instances 610. This may be done in a variety of ways such as having each instance generate a message (heartbeat) to the Domain Administration Server with a given periodicity. Detection of a failed application server instance may be denoted by the absence of its heartbeat. In another embodiment, the Domain Administration Server may poll each application server instance periodically to determine its health. Failure to respond to the poll may indicate a failure of the polled instance. Once a failure is detected, the Domain Administration Server may select one of the other cluster instances 610 to recover the downed server's incomplete transactions. The surrogate application server instance may read the failed server's transactions logs 670 and attempt to recover in flight transactions as described previously. As described above, a timeout value may be configured to specify a delay after detecting a server failure before surrogate recover is begun.

In another embodiment, instead of involving a Domain Administration Server, the application server instances may be responsible for monitoring one another. When they detect a loss of cluster membership that does not restart within a specified time interval, another instance determined by a selection algorithm (e.g. the server instance whose ID is greater than and closest to that of the downed server, or based on a lexicographical ordering of the string cluster_id:server_id) may have the responsibility to change the ownership of all log records in the highly available store from that of the failed server to its own and to attempt to recover the failed server's in flight transactions. For workload balancing considerations, the logs of the failed server may be distributed among multiple nodes and each may attempt to recover a portion of the failed server's in flight transactions. The changing of ownership of the transaction logs or portions thereof may be performed transactionally to insure atomicity.

In yet another embodiment, a failed application server instance may rely on a human agency to detect the failure. A graphical interface utility may assist in manual recovery by loading all log records for a particular instance from the transaction log repository in highly available storage. The utility may communicate with the Domain Administration Server, which may relay the actual recovery instructions to another server instance in the cluster. An administrator or user may specify which transactions are to be recovered by which servers.

Figure 7:
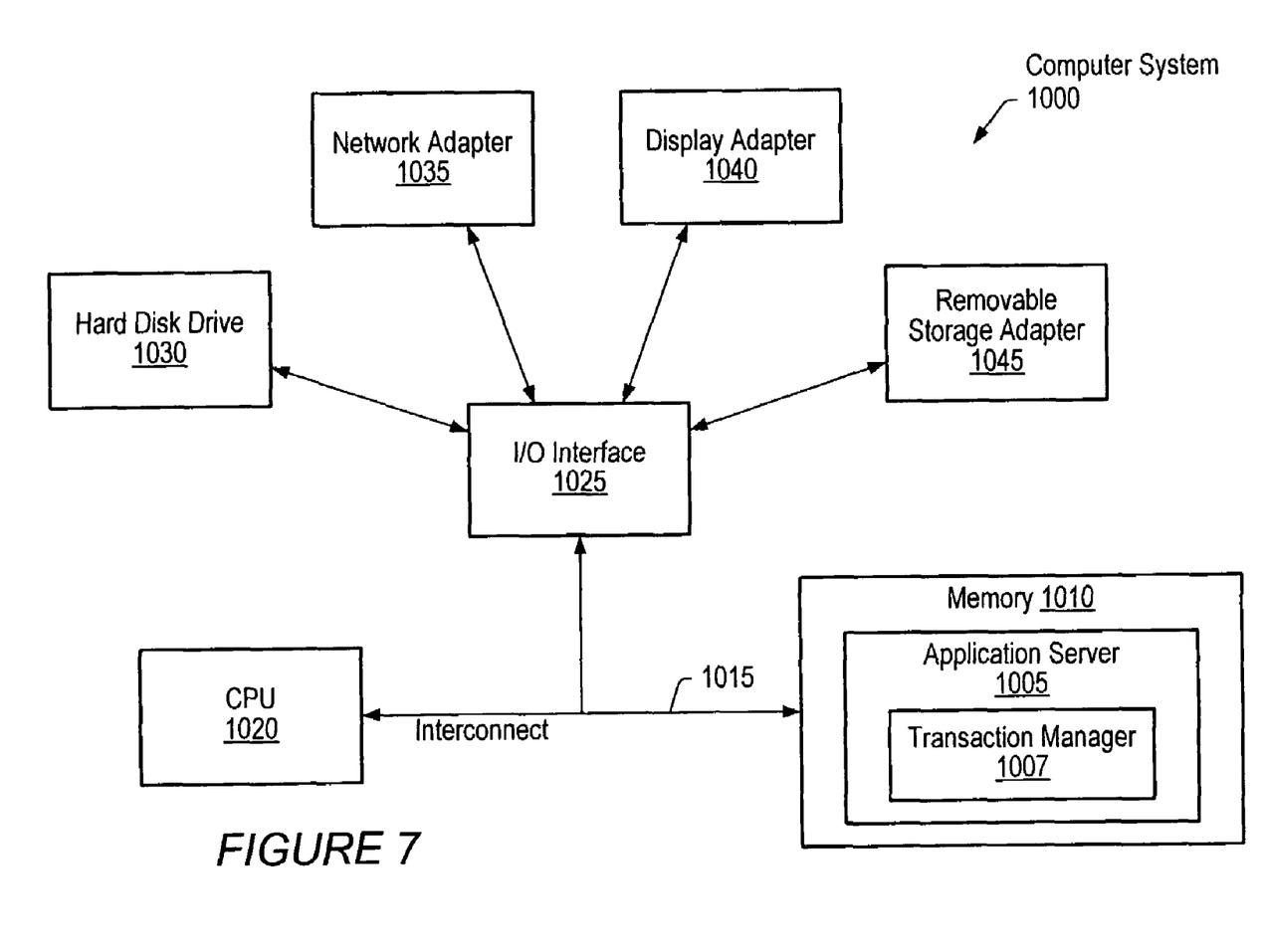
FIG. 7 illustrates an exemplary computer system, according to one embodiment.

FIG. 7 illustrates one embodiment of a computer system 1000 that may include a transaction manager 1007 per application server instance 1005. Computer system 1000 may be a node in the application server clusters illustrated in FIGS. 1 and 2. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium" may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing an application server 1005 may be stored in memory 1010. Application server 1005 may include one or more applications, data sources, data source proxies, transaction manager 1007, and/or a data source ID manager.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, I/O components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other components than shown in FIG. 10 such as application software (e.g., stored in memory 1010), other CPUs, video monitors or other displays, track balls, mice, keyboards, printers, plotters, scanners, or other types of I/O devices for use with computer system 1000.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a server cluster, comprising:
        a plurality of server nodes, wherein each server node comprises:
            an application server instance;
            one or more applications configured to execute within the application server instance and to initiate one or more global transactions each involving a set of data modifying operations to be committed to a plurality of storage resources atomically; and
            one or more separate transaction manager instances each configured to execute within the application server instance;
        wherein each separate transaction manager instance for each application server instance is configured to coordinate transactions initiated within that application server instance, and to log in a transaction log an intermediate status of each uncommitted transaction of the transactions initiated within the application server instance;
        wherein the server cluster is configured to:
            detect a failure of one of the plurality of application server instances of the cluster; and
            in response to said detecting, select one or more surrogate transaction manager instances from one or more of the application server instances of the server cluster that are still operational;
            wherein the one or more surrogate transaction manager instances are configured to read one or more transaction logs of the failed application server and to complete one or more uncommitted transactions indicated by the one or more transaction logs of the failed application server;
            wherein the one or more application server instances having the one or more surrogate transaction manager instances are configured to attempt to recover each in-flight transaction entry in a transaction log of the failed server, wherein for each log entry one or more of the application server instances having one of the one or more surrogate transaction manager instances are configured to open connections to all data sources involved in the transaction corresponding to the log entry, and if all connections are successful, recover the transaction.

2. The system as recited in claim 1, wherein the one or more applications comprise a plurality of applications that initiate transactions, and wherein the one or more separate transaction manager instances comprise a separate transaction manager instance for each application that initiates transactions.

3. The system as recited in claim 1, wherein the cluster is configured to detect the failure of one of the plurality of application server instances by a heartbeat communications protocol.

4. The system as recited in claim 1, wherein the cluster is configured to detect the failure of one of the plurality of application server instances by a periodic polling communications protocol.

5. The system as recited in claim 1, wherein the cluster is configured to select the one or more surrogate transaction manager instances from the one or more application server instances that are still operational based on an identity of the failed application server.

6. The system as recited in claim 1, wherein the one or more surrogate transaction manager instances are configured to recover transactions of the failed application server instance by transferring ownership of transaction logs from the failed application server instance to the one or more surrogate transaction manager instances.

7. The system as recited in claim 6, wherein the one or more surrogate transaction manager instances are configured to transfer ownership of transaction logs from the failed application server instance to the one or more surrogate transaction manager instances as part of a transaction.

8. The system as recited in claim 1, wherein one or more of the application server instances having one of the one or more surrogate transaction manager instances are configured to open connections to all data sources involved in the transaction corresponding to the log entry within a specified period of time, and if all connections are successful, recover the transaction and delete the corresponding log entry.

9. The system as recited in claim 1, wherein the application server instance that failed is configured to restart and attempt to recover the transactions from the log, and in response to determining that no other application server instance has yet attempted to recover the transactions, the failed application server instance is configured to attempt recovery of the transactions upon restart without re-acquiring ownership of the log.

10. The system as recited in claim 1, wherein each application server instance having one of the one or more surrogate transaction manager instances and attempting to recover the transactions from the log is configured to obtain ownership of the transaction log prior to attempting to recover any transactions.

11. The system as recited in claim 1, wherein each application server instance having one of the one or more surrogate transaction manager instances and attempting to recover the transactions is configured to perform an initial recovery attempt and deferred recovery attempts at a predetermined interval to recover remaining transactions not recovered by the initial recovery attempt for a predetermined number of attempts after normal application server instance operations have been resumed after the initial recovery attempt.

12. The system as recited in claim 1, wherein the transaction log is stored in highly available storage accessible to each of the plurality of application server instances of the cluster.

13. The system as recited in claim 12, wherein the highly available storage is a highly available file system, wherein a location of the transaction logs in the highly available file system is configurable by an administrator.

14. A method, comprising:
operating one or more separate transaction manager instances in each node of an application server cluster;
one or more applications initiating a plurality of global transactions in each server node, wherein each of the plurality of global transactions involves a set of data modifying operations to be committed to a plurality of storage resources atomically;
coordinating transactions initiated in a particular server node by the one or more transaction manager instances operating in that node;
each transaction manager instance maintaining transaction logs for transactions it manages in a highly available storage, wherein each transaction log contains an intermediate status of each uncommitted transaction of the transactions it manages and is usable by another transaction manager instance to recover the uncommitted transactions if the transaction manager fails;
detecting a failure of one of the plurality of application server instances of the cluster;
in response to said detecting, selecting one or more surrogate transaction manager instances from one or more of the application server instances of the server cluster that are still operational;
reading, by the one or more selected surrogate transaction manager instances, one or more transaction logs of the failed application server and to complete one or more uncommitted transactions indicated by the one or more transaction logs of the failed application server; and
attempting, by one or more application server instances having the one or more selected surrogate transaction manager instances, to recover each in-flight transaction entry in a transaction log of the failed server, wherein said attempting comprises, for each log entry, opening connections to all data sources involved in the transaction corresponding to the log entry, and if all connections are successful, recover the transaction.

15. The method as recited in claim 14, wherein the one or more applications comprise a plurality of applications in one of the server nodes initiating transactions, and wherein the one or more separate transaction manager instances comprise a separate transaction manager instance operating for each application generating transactions.

16. The method as recited in claim 14, wherein the server nodes of the cluster are a plurality of application server nodes, wherein the highly available storage is accessible to each of the plurality of application server nodes of the cluster, and wherein the highly available storage stores the transaction logs in a location designated by an administrator for the plurality of application server nodes of the cluster.

17. The method as recited in claim 14, further comprising detecting a failure of an application server including one of the separate transaction manager instances on one of the server nodes within the application server cluster.

18. The method as recited in claim 17, further comprising restarting the failed application server of the application server cluster and the transaction manager instance of the restarted application server attempting to recover in flight transactions for an initial predetermined period of time.

19. The method as recited in claim 18, further comprising, in response to one or more transactions not being recovered within the initial predetermined period of time, the transaction manager instance of the restarted application server delaying recovery of the one or more transactions not recovered within the initial period until after the restarted application server has resumed normal server operations while transaction recovery is still in progress.

20. The method as recited in claim 19, further comprising, in response to un-recovered transactions remaining after a maximum number of deferred recovery attempts has been made, the application server generating an error requesting operator intervention.

21. The method as recited in claim 17, further comprising designating, for the failed application server, a surrogate application server including one of the transaction manager instances, and the transaction manager instance of the surrogate application server attempting to recover in flight transactions of the failed application server for an initial predetermined period of time.

22. The method as recited in claim 21, further comprising the transaction manager instance of the surrogate application server implementing deferred transaction recovery in response to one or more transactions not being recovered within the initial period, wherein deferred transaction recovery attempts to recover transactions subsequent to the initial period and after normal application server operations have resumed.

23. The method as recited in claim 22, further comprising, in response to un-recovered transactions remaining after a maximum number of deferred recovery attempts has been made, the surrogate application server generating an error requesting operator intervention.

24. The method as recited in claim 17, wherein the failure of the application server is detected by a heartbeat communications protocol.

25. The method as recited in claim 17, wherein the failure of the application server is detected by a periodic polling communications protocol.

26. The method as recited in claim 21, wherein the surrogate application server is selected from remaining operational application servers of the cluster based on an identity of the failed application server.

27. The method as recited in claim 21, wherein ownership of the transaction logs is transferred from the failed application server to the surrogate as part of a transaction.

28. A computer accessible storage medium storing program instructions that when executed on one or more computers cause the one or more computers to:
operate a separate transaction manager instance in each node in an application server cluster;
initiate one or more transactions in each server node, wherein each of the one or more transactions involves a set of data modifying operations to be committed to a plurality of storage resources atomically;
coordinate transactions initiated in a particular server node by the transaction manager instance operating in that node; and
maintain transaction logs for each transaction manager instance in highly available storage, wherein each transaction log contains an intermediate status of each initiated but uncommitted transaction of the one or more transactions managed by the transaction manager and wherein the log is usable by another transaction manager instance to recover the uncommitted transactions if the transaction manager fails;

detect a failure of one of the plurality of application server instances of the cluster;

in response to said detect, select one or more surrogate transaction manager instances from one or more of the application server instances of the server cluster that are still operational;

read, by the one or more selected surrogate transaction manager instances, one or more transaction logs of the failed application server and to complete one or more uncommitted transactions indicated by the one or more transaction logs of the failed application server; and attempt, by one or more application server instances having the one or more selected surrogate transaction manager instances, to recover each in-flight transaction entry in a transaction log of the failed server, wherein said attempting comprises, for each log entry, opening connections to all data sources involved in the transaction corresponding to the log entry, and if all connections are successful, recover the transaction.

29. The computer accessible storage medium as recited in claim 28, wherein the separate transaction manager instance is one of a plurality of separate transaction manager instances on one of the server nodes, wherein the program instructions are further computer-executable to operate one of the separate transaction manager instances for each of a plurality of applications that initiates a transaction on that one of the server nodes.

30. The computer accessible storage medium as recited in claim 28, wherein the server nodes of the cluster are a plurality of application server nodes, wherein the highly available storage is accessible to each of the plurality of application server nodes of the server cluster, and wherein the highly available storage stores the transaction logs for the plurality of application server nodes of the cluster.

31. The computer accessible storage medium as recited in claim 28, wherein the program instructions are further computer-executable to detect a failure of an application server including one of the separate transaction manager instances on one of the server nodes within the application server cluster.

32. The computer accessible storage medium as recited in claim 31, wherein the program instructions are further computer-executable to, in response to restarting of the failed application server of the application server cluster, attempt to recover in flight transactions for an initial predetermined period of time.

33. The computer accessible storage medium as recited in claim 32, wherein the program instructions are further computer-executable to, in response to one or more transactions not being recovered within the initial predetermined period of time, delay recovery of one or more transactions not recovered within the initial period and resume normal application server operations while transaction recovery is still in progress.

34. The computer accessible medium storage as recited in claim 33, wherein the program instructions are further computer-executable to, in response to un-recovered transactions remaining after a maximum number of deferred recovery attempts has been made, generate an error requesting operator intervention.

35. The computer accessible medium storage as recited in claim 31, wherein the program instructions are further computer-executable to designate one or more surrogates for the failed application server and to attempt to recover in flight transactions of the failed application server for an initial predetermined period of time.

36. The computer accessible storage medium as recited in claim 35, wherein the program instructions are further computer-executable to implement deferred transaction recovery if one or more transactions are not recovered within the initial period, wherein deferred transaction recovery attempts to recover transactions subsequent to the initial period and after normal application server operations have resumed.

37. The computer accessible storage medium as recited in claim 36, wherein the program instructions are further computer-executable to, if un-recovered transactions remain after a maximum number of deferred recovery attempts has been made, generate an error requesting operator intervention.

38. The computer accessible storage medium as recited in claim 31, wherein the failure of the application server is detected by a heartbeat communications protocol.

39. The computer accessible storage medium as recited in claim 31, wherein the failure of the application server is detected by a polling communications protocol.

40. The computer accessible storage medium as recited in claim 35, wherein the surrogate application server is selected from remaining operational application servers of the cluster based on an identity of the failed application server.

41. The computer accessible storage medium as recited in claim 35, wherein ownership of the transaction logs is transferred from the failed application server to the one or more surrogates as part of a transaction.

\* \* \* \* \*